United States Patent [19]

Meguiar

[11] 4,444,701

[45] Apr. 24, 1984

[54] MOLD RELEASE AGENT COMPOSITION AND IMPROVED MOLDING METHOD

[76] Inventor: Floyd L. Meguiar, P.O. Box 3171, South El Monte, Calif. 91733

[21] Appl. No.: 400,410

[22] Filed: Jul. 21, 1982

[51] Int. Cl.³ .............................................. B28B 14/00
[52] U.S. Cl. ..................... 264/40.1; 73/104; 252/301.19; 264/22; 264/39; 264/78; 264/338
[58] Field of Search .................. 264/22, 39, 78, 40.1, 264/338; 252/301.19; 73/104

[56] References Cited

U.S. PATENT DOCUMENTS

| | | | |
|---|---|---|---|
| 2,259,400 | 10/1941 | Switzer | 250/71 |
| 2,667,070 | 1/1954 | Sockman et al. | 73/104 |
| 2,920,203 | 1/1960 | Switzer et al. | 250/71 |
| 3,386,920 | 6/1968 | Alburger | 252/301.2 |
| 3,607,333 | 9/1971 | Albuger | 73/104 |
| 3,904,545 | 9/1975 | Molina | 73/104 |
| 3,992,502 | 11/1976 | Krishnan | 264/338 |
| 4,110,119 | 8/1978 | Boehmke et al. | 264/338 |
| 4,118,203 | 8/1978 | Beardmore et al. | 264/338 |
| 4,160,375 | 7/1979 | Brittain et al. | 73/104 |

*Primary Examiner*—Donald E. Czaja
*Assistant Examiner*—W. Thompson
*Attorney, Agent, or Firm*—Wagner & Bachand

[57] ABSTRACT

An improvement in methods and compositions for molding plastics in which the waxy release agent is treated with an indicator dye invisible under normal light but visible under UV illumination, so that completeness and adequacy of the initial application and remanence of the waxy release agent during repeated cycles can be monitored readily without adversely affecting part quality.

14 Claims, No Drawings

MOLD RELEASE AGENT COMPOSITION AND IMPROVED MOLDING METHOD

TECHNICAL FIELD

This invention has to do with the repetitive molding of articles on molding surfaces and the lubrication of such surfaces for ready release of the molded part from the mold. More particularly, the invention is concerned with new compositions and novel methods of molding articles based on the use of such compositions. In particular, the invention provides compositions and methods for the reliable preparation of molds for the fabrication of resin articles such as those formed of poly(ester), urethane, olefin, or epoxy resins, and the easy determination of the presence and extent of mold release agent on the molding surfaces before and during a sequence of repetitive molding operations, all for the purpose of speeding molded part production, and avoiding hang-up of parts in the mold, impairment of part surfaces, and destruction of costly, highly finished molding surfaces.

BACKGROUND ART

Articles as widely varied as decorative moldings, cultured marble and onyx tubs and vanities and boat hulls are today formed from settable compositions comprising suitable resins, chiefly at the present time poly(ester), urethane, olefin, and epoxy resins and suitable hardeners as necessary, filled with glass e.g. glass fiber, with clays, talcs, or similar mineral material useful to reinforce, fill, or add decorative effects to the resin. The term "poly(ester)" herein refers to polyesters such as polyethylene terephthalate product of terephthalic acid and ethylene glycol, and vinyl ester polymers as well.

These resins, together with their fillers, catalysts, colorants, and other typical components are formed on a molding surface, with or without pressure, enclosed or not, following pouring, spraying, layup, impregnation or other deposition onto the molding surface, which is typically precoated with a gel coat, typically isophthalic acid or orthophthalic acid-based polyester resin, to form a finish surface on the molded resin, subjected to air or heat setting, cure or hardening, and when set are removed from the mold. It may happen that the molded part sticks to the mold surface, particularly where the surface is other than a simple plane. In this event, either the part, or the mold, or both is liable to be harmed by efforts to separate the two, and fine stress lines may develop in molded parts subsequently processed. Sticking problems can be avoided by the use of an effective mold release agent interposed between the mold surface and the resin composition/gel coat applied to the mold. In practice it has been found that the effectiveness of these mold release agents is often not realized because coverage of the mold surfaces is incomplete, i.e. there are skipped areas, or holidays, or the coverage is inadequate, i.e. the depth of release agent coating is insufficient, even for a single molding operation. In practice, the molding operations are usually repetitive, producing a succession of replicate parts. Desirably the mold release agent will last through several cycles for manufacturing economy.

Whether the initial coating is complete and adequate, and what remains of it during successive cycles is presently difficult to determine. The release agents are typically fine waxes, usually synthetic organic polymers of low molecular weight such as those of high density and medium density polyethylene, blended to desired physical properties. The detection of such waxes in situ is difficult because they are transparent to water-white, tend to blend with the mold surface over time and even when visible there is insufficient contrast to make a judgment on adequacy of coverage even if coverage appears complete. The practical result of this situation is the too many or too few wax applications are used, with either course increasing manufacturing costs, and in the latter case risking expensive loss of parts or molds.

To increase the contrast of the mold release agent on the molding surface, as by using colored waxes, is counterindicated in nearly all situations, since the molded article must be free of wax color. Post-production removal of the wax color is both costly and ineffective, and may ruin the surface finish of the article, thereby making it unsalable.

DESCRIPTION OF THE INVENTION

It is an object therefore of the present invention to provide a means for detecting both the completeness and adequacy of coverage of mold release agents on the molding surface, and without adversely affecting the utility of the mold or molded article in any respect. It is a more particular object to provide a method of molding, a method of making tooling useful for molding, a method of manufacturing a mold release agent, and a novel mold release agent composition which obviate sticking of the molded article to the mold on the initial cycle, and for a determinable number of subsequent cycles, by enabling the reliable and ready inspection of the completeness and adequacy of release agent coverage after applying and after each mold cycle if desired, at low cost in labor, equipment and materials. It is a still further object to provide the above benefits without coloring clear gel coats or introducing spurious color factors into colored gel coats.

These and other objects of the invention to become apparent hereinafter are realized in accordance therewith in the method of molding articles of settable synthetic organic plastic against a molding surface having a mold release agent thereon, which comprises the steps of forming a mold release agent composition therefor by dispersing into a waxy mold release agent an effective amount of an indicator compound stable under plastic molding conditions, colorless under illumination in the visible light spectrum and colored under illumination in the nonvisible light spectrum, coating the molding surface with the composition, periodically exposing the coated molding surface to nonvisible light in indicator composition-illuminating relation, further coating the molding surface with the composition where the presence and extent of the composition is indicated to be incomplete or inadequate for release of the articles from the mold, and molding the settable plastic against the surface until set.

In particular embodiments, there is further included molding a succession of articles on the molding surface, periodically reexposing the molding surface to nonvisible light between successive moldings, and recoating the molding surface with the composition when the presence and extent of the composition is indicated to be incomplete or inadequate for release of the subsequently molded articles from the mold.

The method further contemplates selecting a waxy release agent comprising a normally solid low molecular weight synthetic organic polymer of an aliphatic hydrocarbon, selecting as the settable plastic a curable poly(ester), urethane, olefin, or epoxy resin composition, selecting as the indicator an indicator which fluoresces responsive to ultraviolet light, and exposing the release composition on the molding surface to ultraviolet light whereby the indicator compound is illuminated in color developing relation and graphically indicates the distribution and depth of the composition, combining application-facilitating solvents for the release agent in the composition, the indicator being stable against deterioration by the solvents, selecting as the indicator compound a fluorescent dye which selectively absorbs in the nonvisible spectrum and emits in the visible spectrum, adding a particulate fluorescent dye to the composition as a second indicator compound in minor weight amount relative to the first fluorescent dye, the particulate fluorescent dye being selectively absorptive in the nonvisible spectrum and emiting in the visible spectrum, and selecting indicator compounds generating a violet-to-blue color in the composition responsive to ultraviolet illumination.

Accordingly, the invention includes the method of replicate molding synthetic organic plastic articles, which includes precoating a mold surface with a waxy release agent composition containing a latent visual indicator invisible on the molded articles under visible light but visible on the molding surface under nonvisible light, shaping a settable plastic on the mold surface when the surface has a sufficient coating of mold release agent as indicated by the indicator under exposure to nonvisible light, and maintaining shaping contact of the plastic with the coated mold until the plastic is set.

As in the previous embodiment, the foregoing embodiment includes selecting a waxy release agent comprising a normally solid low molecular weight synthetic organic polymer of an aliphatic hydrocarbon, and combining the polymer with solvents therefor to facilitate application of the composition to the molding surface; selecting as the settable plastic a poly(ester), urethane, olefin, or epoxy resin composition; and selecting as the indicator an indicator which fluoresces selectively responsive to ultraviolet light, exposing the release composition to ultraviolet light to thereby illuminate the composition, and adding release composition to the molding surfaces where the illumination indicates a deficiency thereof for good release of molded articles.

Further contemplated is the method of preparing tooling for molding settable synthetic organic plastic and the like, including applying to the tooling surface a composition comprising a waxy agent and an effective amount of an indicator compound stable under use conditions, colorless under illumination in the visible light spectrum and colored under illumination in the nonvisible light spectrum, alternately abrasively removing and reapplying the composition and periodically exposing the tooling surface to nonvisible light in indicator compound-illuminating relation to reveal the relative smoothness condition of the surface by the relative presence or absence of said composition.

In still other embodiments of the invention there is provided a method of preparing a mold release composition having coverage signaling capability, including intimately mixing normally solid synthetic organic polymeric wax, wax solvents, and an effective amount of an indicator stable under mold release use conditions, the indicator comprising a dye differentially responsive to visible and nonvisible light whereby mold release composition coverage of a molding surface is detectable by exposing the composition to nonvisible light, and articles molded thereon are apparently free of mold release composition in visible light.

This method of the invention typically further includes solvating the wax under heat, and dispersing the indicator thereinto, and combining first and second indicator compounds in the solvated wax at an elevated temperature and thereafter cooling, the first indicator compound being added in liquid form and relatively readily dispersible in the solvated wax and relatively less remanent on the molding surface, the second indicator compound being particulate and relatively less dispersible in the solvated wax and relatively more remanent on the molding surface through successive molding cycles, the first and second indicator compounds cooperating to define a coverage-indicating color in the composition responsive to ultraviolet light illumination.

The invention further teaches novel mold release agent compositions comprising synthetic organic wax, wax solvent, and a small but effective amount of an indicator compound differentially responsive to visible and nonvisible light to signal presence and distribution of release composition on a mold under nonvisible light excitation, but othewrwise invisible on articles molded thereagainst.

Typically in such compositions the wax comprises a low molecular weight synthetic organic polymer of an aliphatic hydrocarbon, and the indicator compound comprises a fluroescent dye which absorbs in the nonvisible spectrum and emits in the visible spectrum, and more particularly the indicator compound is an ultraviolet light fluorescing responsive derivative of stilbene, 4,4'-diaminostilbene, biphenyl, triazol, oxazole, imidazole, coumarin, naphthalimide, or s-triazine indicator precursor, and is present in an amount between 0.5 and 5 parts per million based on the total mold release agent composition.

In a more particularly preferred embodiment, the indicator compound comprises a first readily dispersible compound added to the composition as a liquid, and a second relatively less dispersible compound added to and maintained in the composition as a solid.

PREFERRED MODES

The present invention is useful in the plastics molding industry, and particularly in the fields of cultured marble, fiberglass reinforced plastic, and filled or unfilled poly(ester), urethane, epoxy and olefin polymer plastics. These plastics are generally shaped by molding against a gel coat preapplied to a rigid molding surface, the finish of the molded part replicating the mold finish. Because of the intimate contact between the mold and the molded surface, the sometimes intricate configuration of the mold and the chemical nature of the mold and the molding plastic, e.g. both may be poly(ester), there can develop a bonding between the plastic being molded and the mold. If this occurs, the two can be separated only with difficulty, and usually only at the price of ruining the surface and thus the saleability of the part, or even worse destroying the utility of the mold for further molding, at considerable expense.

The art has developed waxy release agents to lubricate the mold surfaces. These agents, typically waxes of low molecular weight aliphatic hydrocarbons, silicones, and the like are coated onto the mold surface in advance of molding and prevent sticking of the part to the mold. It is critical that the waxy release agent be so smooth in application as to not affect adversely the surface finish of the part molded. Of course, resistance to deterioration under molding conditions is a necessity as well. The state of mold release agents is well developed, but problems remain, principally in ensuring the complete coverage of the molding surface, and an adequate depth of the coverage in covered areas. At the present time the completeness and adequacy of coverage is dependent on use of sufficiently skilled labor, and enough time, both costly, backed up by visual inspection. In fact the coverage despite these precautions is often spotty and ruined parts and destroyed molds can and do occur.

As noted above, this invention provides method and composition useful for determining reliably and instantly the completeness and adequacy of coverage of the mold surface by the waxy release agent. This is achieved with conventional wax systems, without changing their performance, and a low cost, with no great amount of added labor expense.

By incorporating a signal generating indicator in the waxy release agent, a composition is realized which upon suitable illumination, i.e. "black light", the former low to nonexistent contrast of the wax with the mold is brought into high contrast and the depth and distribution of the wax revealed. The operation is simple enough to be carried out by unskilled labor, uses low cost apparatus, and is easily acomplished between successive molding operations to determine remanence of the wax agent on the mold surface.

EXAMPLE

A polyester siding panel was molded by coating a shingle pattern simulating surface mold itself made of polyester, with a waxy release agent according to the invention and comprising a high density polyethylene microcrystalline wax and silicone resin mixture at 34% by weight of the composition, and the balance solvents comprising mineral spirits essentially aliphatic petroleum naphthas in the 320°–392° F. boiling range. The waxy release agent was modified by the incorporation of an alcoholic fluorescing dye solution, which emits blue-green under UV light at 392 nanometers, at 4 parts by weight of a 0.5% solution per 100 parts by weight of the above wax formulation. To ensure remanence in the indicator, an additional amount of dye, this one the optical brightner Uvitex OB from Ciba (a benzoxazole theophene), was added at the rate of 1 part per 5 parts of the alcohol solution dye mentioned. Too much of the latter dye, or any solid dye may result in surface imperfections through protrusions of the dye particulates.

The dye system described was added under high speed shear agitation to the wax base at about 200° F. After the wax cooled to room temparture, it was wiped onto the mold with a soft cloth. After attempting to cover all areas of the mold equally and to get into the valleys defining the shingle grooving, the surface was gone over with a long wave UV lamp, and numerous areas not adequately covered were noted by virtue of their absence of reflection of the light with the characteristic geeen-blue luminescence of the dyes. The waxy release agent was applied again, particularly to the skipped or light application areas. After several repititions of this process, the mold was adequately covered, highly uniformly all over, as revealed by the constant glow across the mold surface of the luminous dye under the lamp illumination.

The molding surface was then coated with a gel coat comprising a colored film-forming resin. The polyester was sprayed together with chopped glass fiber and catalyst onto the mold to an adequate depth. Part separation was easy and smothly accomplished. Inspection of the colored surface film showed no effect from the use of the dyes, except that under UV light only the release agent composition was detectable. The mold was inspected for remaining release agent, touched up where necessary only, at a great savings in labor over redoing the entire surface, with periodic inspections to ascertain adequacy and completeness of coverage, and additional parts were molded. As many as 5 and more replications could be taken from a single basic application of the release agent composition.

Thus when molding any setting plastic such as those mentioned above, improved results will be had if the mold is first coated with the indicator compound containing waxy release agent composition. The composition is prepared by intimately dispersing the indicator compound in the wax. Typically these waxes are prepared by solvating a normally solid wax in suitable solvents with heat. The indicator compound to be used, selected for its heat and chemical resistance is incorporated in the wax solution and thereby dispersed therein. It has been found that predissolving the indicator compound in a solvent vehicle compatible with the wax vehicles is beneficial in obtaining good dispersions. It has further been found that indicator compound dyes added as solutions while more readily mixed and dispersed, tend to be less permanent in the composition on the mold, where heat either added or exothermic tends to reduce dye effectiveness. For this reason, it is preferred in this invention to use a second indicator compound, one added and maintained as a particulate solid to the waxy composition, along with the liquid-added dye. Because it is desirable to keep particulates in the waxy release agent to a minimum to avoid marring the surface finish on parts molded, the particle size of the added indicator, and its quantity are suitably kept at minimum values. Thus use of 250 mesh and smaller particles is desired, and the solids component of the indicator is typically kept at between 5 and 35% by weight, and preferably at about 20%. The balance of the indicator compound is added as liquid, whether the indicator dye is normally liquid or simply dissolved in a suitable solvent. Overall concentration of indicator compound need not exceed about 1 to 2 parts per million, with lesser amounts, to 0.5 ppm. for example being useful in certain less critical applications, and higher concentrations. e.g. beyond about 5 parts being not usually necessary and preferably avoided where expense of the indicator compound is a concern.

The indicator compounds are broadly those materials which are colorless in the visible light spectrum, so as to be invisible on a molded part if they are transferred from the mold surface to the part. These compounds are those which do not absorb in the visible spectrum, e.g. in the range of 400 nm. and higher. The compounds rather absorb in the nonvisible spectrum, and emit in the visible spectrum when subjected to excitation as by being illuminated by a black light. This phenomenon of fluroescence is used to advantage herein to enable simple black light scanning, e.g. at 365 to 395 nm., and visual or instrument inspection of the light emitted e.g. at 410 to 460 nm. up to 550 nm., to determine from the extent of the light the completeness of coverage, and from the intensity of the light the depth of coverage or adequacy as it is referred to herein.

While all dyes invisible in visible light, so as to not mar the product, but visible when excited with nonvisible light, are potentially useful herein, the chemical and heat resistance required must be kept in mind when selecting an indicator compound or compounds. Because of the wide variety of such compounds available it is impractible to list all suitable ones, or their many derivatives some of which will have suitable chemical resistance and heat resistance, and some not. The selection is further complicated by the varying nature of solvent systems, molding conditions, and resin types used against the release agent composition. Suitable indicator compounds however can be obtained from commercial sources if heat resistance and chemical resistance criteria are observed, from among derivatives of stilbene, particularly the bistriazinyl derivative of 4,4'-diaminostilbene-2,2'-disulfonic acid; derivatives of the bis(azol-2-yl)stilbenes, such as 4,4'-bis(triazoyl-2-yl)stilbene 2,2'-disulfonic acid; the 1,4-bis(styrl)benzenes; the biphenyls such as 4,4'-bis(styrl)biphenyls; the pyrazolines, such as 1,3-diphenyl-2-pyrazolines, derivatives of bis(benzoyl-2-yl) such as bis(benzoxazol-2-yl); derivatives of bis(benzimidazol-2-yl) and 2-(benzofuran-2-yl)benzimidazoles; 7-hydroxy, and other 7-substituted amino coumarins, carbostyryls; naphthalimides, such as alkoxy napthalimides; and pyrene derivatives, e.g. with 2,4-dimethoxy-6-chloro-s-triazine. Others will occur to those in the art. In case of doubt, the indicator, fluorescing dye should be tested by exposure to heat in an oxygen-free enclosure at 572° F. for 8, and to 392° F. temperatures in air for 8 hours, to ensure stability in subsequent molding protective use.

I claim:

1. In the method of molding articles of settable synthetic organic plastic against a molding surface having a mold release agent thereon, the steps of forming a mold release agent composition therefor by dispersing into a waxy mold release agent an effective amount of an indicator compound stable under plastic molding conditions, colorless under illumination in the visible light spectrum and colored under illumination in the nonvisible light spectrum, coating said molding surface with said composition, periodically exposing said coated molding surface to nonvisible light in indicator compound-illuminating relation, further coating said molding surface with said composition where the presence and extent of said composition is indicated to be incomplete or inadequate for release of said articles from said mold, and molding said settable plastic against said surface until set.

2. The method according to claim 1, including also molding a succession of articles on said molding surface, periodically reexposing the molding surface to nonvisible light between successive moldings, and recoating said molding surface with said composition when the presence and extent of said composition is indicated to be incomplete or inadequate for release of successively molded articles from said mold.

3. The method according to claim 1, including also selecting a waxy release agent comprising a normally solid low molecular weight synthetic organic polymer of an aliphatic hydrocarbon.

4. The method according to claim 1, including also selecting as the settable plastic a poly(ester), urethane, olefin or epoxy resin composition.

5. The method according to claim 1, including also selecting as said indicator an indicator which fluoresces responsive to ultraviolet light, and exposing said release composition on said molding surface to ultraviolet light whereby said indicator compound is illuminated and graphically indicates the distribution and depth of said composition.

6. The method according to claim 1, including also combining application-facilitating solvents for said release agent in said composition, said indicator being stable against deterioration by said solvents.

7. The method according to claim 1, including also selecting as said indicator compound a fluorescent dye which selectively absorbs in the nonvisible spectrum and emits in the visible spectrum.

8. The method according to claim 7, including also adding a particulate fluorescent dye to said composition as a second indicator compound in minor weight amount relative to said fluorescent dye, said particulate fluorescent dye being selectively absorptive in the nonvisible spectrum and emitting in the visible spectrum.

9. The method according to claim 8, including also selecting indicator compounds generating a violet-to-blue color in said composition responsive to ultraviolet illumination.

10. Method of replicate molding synthetic organic plastic articles, including precoating a mold surface with a waxy release agent composition containing a latent visual indicator invisible on the molded articles under visible light but visible on the molding surface under nonvisible light, shaping a settable plastic on said mold surface when said surface has a sufficient coating of mold release agent as indicated by said indicator under exposure to nonvisible light, and maintaining shaping contact of the plastic with the coated mold until the plastic is set.

11. The method according to claim 10, including also selecting a waxy release agent comprising a normally solid low molecular weight synthetic organic polymer of an aliphatic hydrocarbon, and combining said polymer with solvents therefor to facilitate application of said composition to said molding surface.

12. The method according to claim 11, including also selecting as the settable plastic a poly(ester), urethane, olefin or epoxy resin composition.

13. The method according to claim 11, including also selecting as said indicator an indicator which fluoresces selectively responsive to ultraviolet light, exposing said release composition to ultraviolet light to thereby illuminate said composition, and adding release composition to said molding surfaces where said illumination indicates a deficiency thereof for good release of molded articles.

14. The method of preparing tooling for molding settable synthetic organic plastic and the like, including applying to the tooling surface a composition comprising a waxy agent and an effective amount of an indicator compound stable under use conditions, colorless under illumination in the visible light spectrum and colored under illumination in the nonvisible light spectrum, alternately abrasively removing and reapplying said composition and periodically exposing the tooling surface to nonvisible light in indicator compound-illuminating relation to reveal the relative smoothness condition of said surface by the relative presence or absence of said composition.

* * * * *